(12) United States Patent
Roth (10) Patent No.: US 11,282,303 B2
(45) Date of Patent: Mar. 22, 2022

(54) SYSTEM AND METHOD FOR IDENTIFYING VEHICLE OPERATION MODE (71) Applicant: Gentex Corporation, Zeeland, MI (US)

(72) Inventor: Mark R. Roth, Grand Rapids, MI (US)

(73) Assignee: GENTEX CORPORATION, Zeeland, MI (US)

(*) Notice: Subject to any disclaimer, the term of this patent is extended or adjusted under 35 U.S.C. 154(b) by 292 days.

(21) Appl. No.: 16/205,617

(22) Filed: Nov. 30, 2018

(65) Prior Publication Data
US 2019/0172273 A1 Jun. 6, 2019

Related U.S. Application Data (60) Provisional application No. 62/593,737, filed on Dec. 1, 2017.

(51) Int. Cl.
G07C 5/02 (2006.01)
G07C 5/08 (2006.01)
(Continued)

(52) U.S. Cl.
CPC ............ G07C 5/02 (2013.01); B60Q 1/50 (2013.01); B60R 1/04 (2013.01); G06K 9/00818 (2013.01); G07C 5/08 (2013.01); G07C 5/0825 (2013.01); B60K 6/22 (2013.01); B60R 1/1207 (2013.01); B60R 11/04 (2013.01);
(Continued)

(58) Field of Classification Search
CPC .......... G07C 5/02; G07C 5/08; G07C 5/0825; B60Q 1/50; B60R 1/04; B60R 1/1207; B60R 11/04; B60R 2001/1253; B60K 6/22; B60Y 2200/92; G05D 1/021; G05D 2201/0213; G08G 1/166; G06K 9/00818; G06K 9/00838
See application file for complete search history.

(56) References Cited

U.S. PATENT DOCUMENTS 4,849,733 A * 7/1989 Conigliaro .............. B60R 22/48
340/457.1
5,837,994 A 11/1998 Stam et al.
(Continued)

OTHER PUBLICATIONS

High-occupancy vehicle lane, Wikipedia, Nov. 21, 2017 (Year: 2017).*
(Continued)

Primary Examiner — Alan D Hutchinson
(74) Attorney, Agent, or Firm — Price Heneveld LLP; Brian James Brewer (57) ABSTRACT The disclosure provides for an accessory for a vehicle. The accessory comprises a housing forming a front surface configured to display a rearward directed field of view from the vehicle and a rear surface directed in a forward operating direction of the vehicle. An at least partially light transmissive panel is directed toward a front windscreen of the vehicle and is in connection with the rear surface. A light source is disposed in the housing proximate the light transmissive panel and is configured to emit light through the at least partially light transmissive panel. A controller is in communication with the light source. The controller is configured to receive an indication of an operating condition of the vehicle and selectively activate the light source in response to the operating condition of the vehicle.

20 Claims, 5 Drawing Sheets (51) Int. Cl.
*B60Q 1/50* (2006.01)
*B60R 1/04* (2006.01)
*G06K 9/00* (2006.01)
*G05D 1/02* (2020.01)
*B60K 6/22* (2007.10)
*B60R 1/12* (2006.01)
*B60R 11/04* (2006.01)

(52) U.S. Cl.
CPC ... *B60R 2001/1253* (2013.01); *B60Y 2200/92* (2013.01); *G05D 1/021* (2013.01); *G05D 2201/0213* (2013.01)

(56) References Cited

U.S. PATENT DOCUMENTS

| | | |
|---|---|---|
| 5,990,469 A | 11/1999 | Bechtel et al. |
| 6,008,486 A | 12/1999 | Stam et al. |
| 6,049,171 A | 4/2000 | Stam et al. |
| 6,130,421 A | 10/2000 | Bechtel et al. |
| 6,130,448 A | 10/2000 | Bauer et al. |
| 6,403,942 B1 | 6/2002 | Stam |
| 6,465,963 B1 | 10/2002 | Turnbull et al. |
| 6,587,573 B1 | 7/2003 | Stam et al. |
| 6,611,610 B1 | 8/2003 | Stam et al. |
| 6,614,579 B2 * | 9/2003 | Roberts ............... B60Q 1/2665 250/208.1 |
| 6,621,616 B1 | 9/2003 | Bauer et al. |
| 6,631,316 B2 | 10/2003 | Stam et al. |
| 6,774,988 B2 | 8/2004 | Stam et al. |
| 6,861,809 B2 | 3/2005 | Stam |
| 8,045,760 B2 | 10/2011 | Stam et al. |
| 8,339,526 B2 | 12/2012 | Minikey, Jr. et al. |
| 10,053,001 B1 * | 8/2018 | Nabbe ..................... B60Q 1/50 |
| 2009/0096937 A1 | 4/2009 | Bauer et al. |
| 2010/0169007 A1 * | 7/2010 | Kaushik ................. G01C 21/26 701/532 |
| 2015/0175057 A1 | 6/2015 | Salter et al. |
| 2016/0229335 A1 * | 8/2016 | Geller .................... B60Q 1/30 |
| 2017/0060234 A1 | 3/2017 | Sung |
| 2017/0315349 A1 | 11/2017 | Weller et al. |
| 2018/0208185 A1 * | 7/2018 | Nagraj Rao .......... B60W 30/09 |
| 2018/0372504 A1 * | 12/2018 | Singhal .............. G01C 21/3492 |

OTHER PUBLICATIONS

How E-ZPass Works, How Stuff Works, Oct. 6, 2017 (Year: 2017).*
U.S. Appl. No. 60/394,583, filed Jul. 9, 2002, entitled Vehicle Vision System With High Dynamic Range.
U.S. Appl. No. 60/404,879, filed Aug. 21, 2002, entitled Image Acquisition and Processing Method for Vehicular Lighting Control.
U.S. Appl. No. 60/780,655, filed Mar. 9, 2006, entitled Vehicle Rearview Assembly Including a Transflective Mirror Element and a High Intensity Display.
U.S. Appl. No. 60/804,351, filed Jun. 9, 2006, entitled Vehicle Rearview Assembly Including a Transflective Mirror Element and a High Intensity Display.

* cited by examiner

SYSTEM AND METHOD FOR IDENTIFYING VEHICLE OPERATION MODE

CROSS-REFERENCE TO RELATED APPLICATION

This application claims the benefit of and priority to U.S. Provisional Patent Application No. 62/593,737, filed on Dec. 1, 2017, entitled SYSTEM AND METHOD FOR IDENTIFYING VEHICLE OPERATION MODE, the entire disclosure of which is hereby incorporated herein by reference.

TECHNOLOGICAL FIELD

The disclosure relates to an indicator system for a vehicle and, more specifically, to an indicator device configured to indicate an operating mode of a vehicle.

BRIEF SUMMARY

In some embodiments, the disclosure provides for an accessory for a vehicle. The accessory comprises a housing forming a front surface configured to display a rearward directed field of view from the vehicle and a rear surface directed in a forward operating direction of the vehicle. An at least partially light transmissive panel is directed toward a front windscreen of the vehicle and is in connection with the rear surface. A light source is disposed in the housing proximate the light transmissive panel and is configured to emit light through the at least partially light transmissive panel. A controller is in communication with the light source. The controller is configured to receive an indication of an operating condition of the vehicle and selectively activate the light source in response to an operating condition of the vehicle.

In some embodiments, a method for controlling an indicator accessory for a vehicle is disclosed. The method comprises detecting a vehicle operating requirement for operation on a roadway and monitoring an operating condition of the vehicle. The operating condition indicates at least one of a vehicle occupancy requirement, a vehicle propulsion characteristic, and an autonomous vehicle operation condition. The method further comprises selectively activating a light source disposed on a forward directed portion of a rearview assembly comprising the indicator accessory in response to the operating condition. The light source is controlled to emit a compliance indication outward through a portion of the vehicle.

In some embodiments, an indication accessory for a vehicle is disclosed. The accessory comprises a housing comprising a front surface configured to display a rearward directed field of view from the vehicle and a rear surface directed in a forward operating direction of the vehicle. A light source is in connection with the accessory and configured to emit light from the rear surface of the housing. An imager is configured to capture image data in a field of view proximate to the vehicle. A controller is configured to process the image data and identify at least one roadway symbol. Based on the roadway symbol, the controller may determine an operation compliance requirement for the operation of the vehicle. The controller may further monitor an operating characteristic of the vehicle. Based on the operating characteristic, the controller may selectively activate the light source emitting a compliance indication from the vehicle in response to the operating characteristic conforming to the operation compliance requirement.

These and other features, advantages, and objects of the present disclosure will be further understood and appreciated by those skilled in the art by reference to the following specification, claims, and appended drawings.

DETAILED DESCRIPTION

Figure 1:
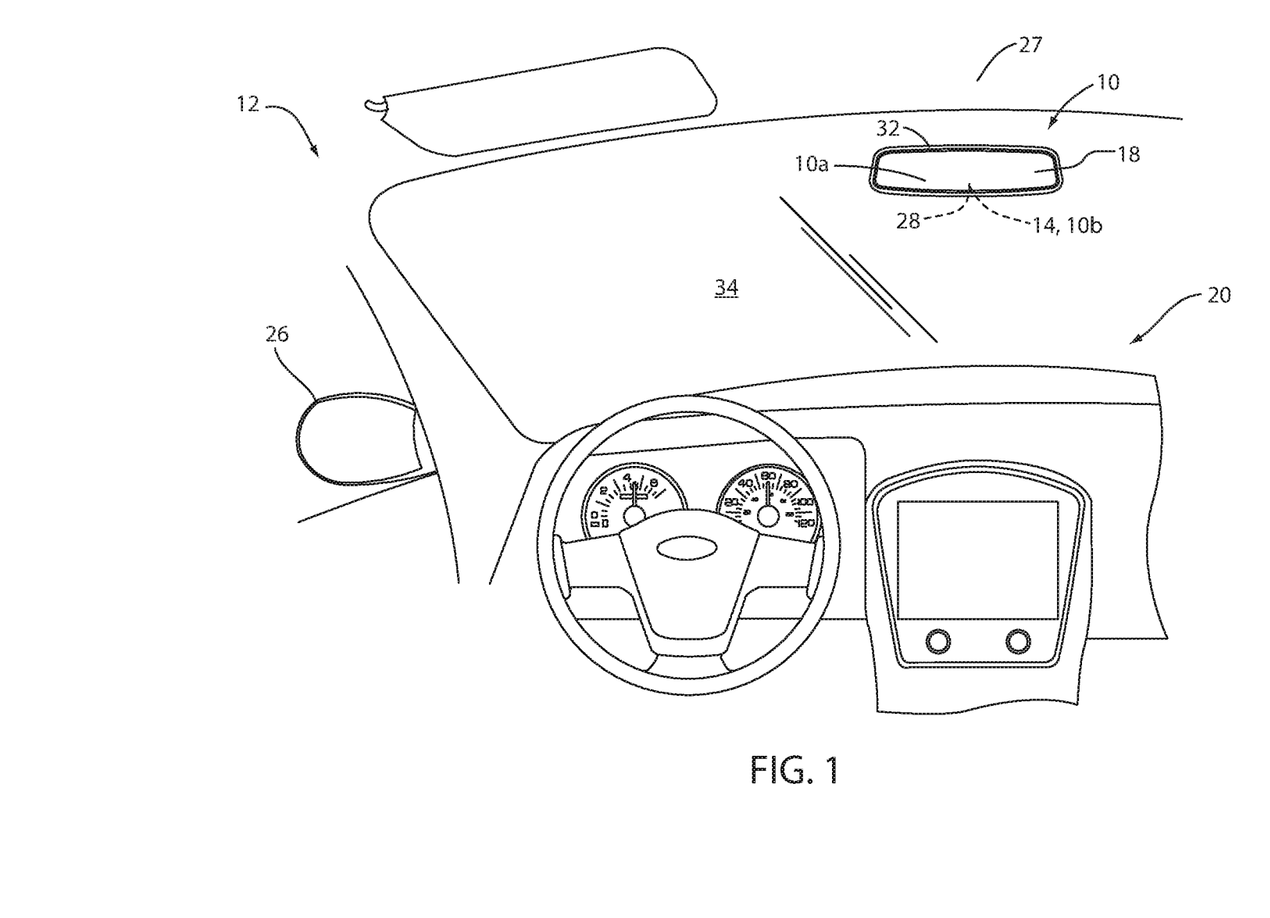
FIG. 1 is a diagram of a vehicle interior demonstrating a vehicle accessory comprising an operation indicator.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1, 2A, 2B, and 2C, a vehicle accessory 10 for a vehicle 12 is shown. The vehicle accessory 10 comprises an operation indicator 14, which may be in communication with a controller. The controller indicated by reference numeral 60 is demonstrated in FIG. 5. In an exemplary embodiment, the vehicle accessory 10 may correspond to an interior mirror assembly 18 or vehicle display. In such embodiments, the vehicle accessory 10 may be configured to display a rearward directed field of view into a passenger compartment 20 of the vehicle 12. The operation indicator 14 may be disposed on a rear surface 10b of the vehicle accessory 10 and configured to illuminate a portion of the rear surface 10b to direct light in a forward operating direction of the vehicle 12. As described herein, the vehicle accessory 10 comprises a front surface 10a directed into the passenger compartment 20 and the rear surface 10b directed in a forward operating direction of the vehicle 12. Though demonstrated as being incorporated in the interior mirror assembly 18, the operation indicator 14 may be incorporated in an exterior mirror assembly 26, a vehicle panel, a headliner portion 27, and/or as a stand-alone device disposed proximate a forward directed portion of the vehicle 12.

The operation indicator 14 may comprise a light source 28 configured to illuminate a lens or panel 30 incorporated in a housing 32 of the vehicle accessory 10. The panel 30 may correspond to an at least partially light transmissive element configured to transmit light from the light source 28 outward from the rear surface 10b. Accordingly, the panel 30 may be disposed on or form a portion of the rear surface 10b of the vehicle accessory 10 such that the operation indicator 14 is positioned proximate a front windscreen 34 of the vehicle 12. In this configuration, an emission of light from the operation indicator 14 may illuminate the panel 30 such that an indicator emission 36 of light is directed in the forward operating direction of the vehicle 12 outward through a central portion of the windscreen 34. The indicator emission 36 may identify one or more operating properties or operating modes of the vehicle 12, which may be visible from outside the vehicle 12.

Figure 2A:
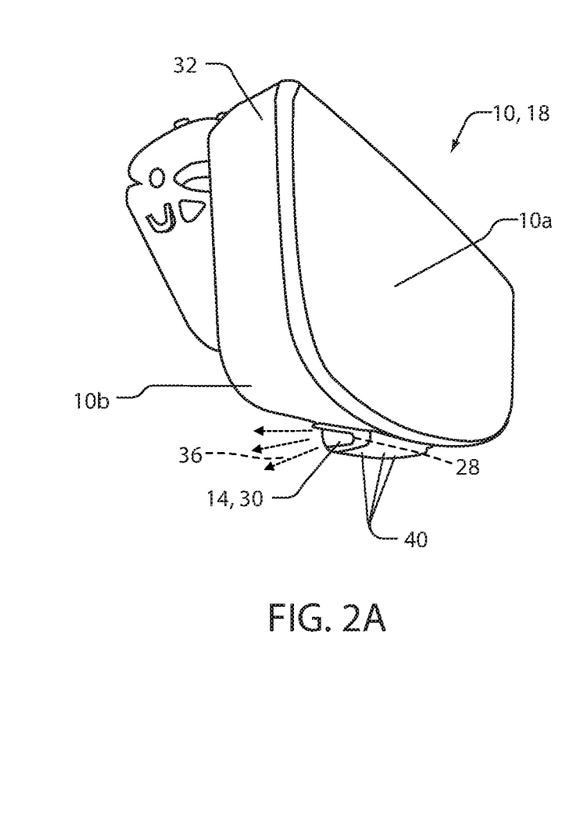
FIG. 2A is a partial front projected view of a vehicle accessory incorporated in an interior mirror or display comprising an operation indicator.
Figure 2B:
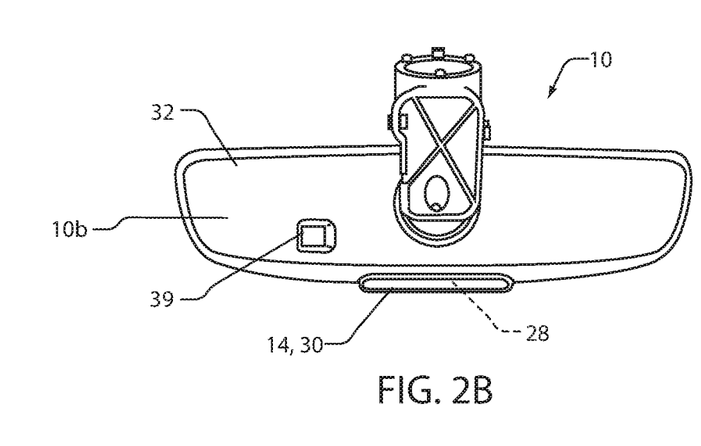
FIG. 2B is a rear-projected view of a vehicle accessory comprising an operation indicator.
Figure 2C:
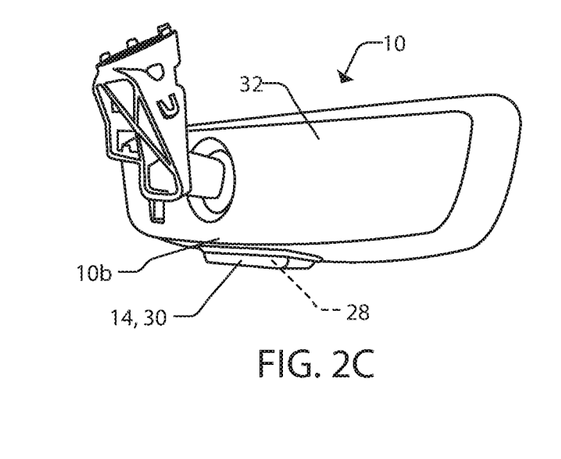
FIG. 2C is a partial rear projected view of a vehicle accessory comprising an operation indicator.

Still referring to FIGS. 2A, 2B, and 2C, the vehicle accessory 10 may comprise a forward-facing image sensor 39 incorporated in the rear surface 10b. The image sensor may be configured to capture image data in a scene typically comprising oncoming objects. The vehicle accessory 10 may comprise one or more input devices 40 configured to control operation of one or more features of the accessory 10. For example, the controller of the accessory 10 may be in communication with the input devices 40 and configured to control one or more programmable operations. In an exemplary embodiment, the accessory 10 may comprise a trainable transceiver or transmitter 41 (e.g. a wireless transmitter configured to control a remote electronic device), such as a HOMELINK® device. In such embodiments, the controller may be configured to receive user inputs to the input devices 40 to control the transceiver to emit wireless transmissions to control one or more remote electronic devices (e.g. garage doors, lights, barriers, smart home devices, etc.).

Figure 3:
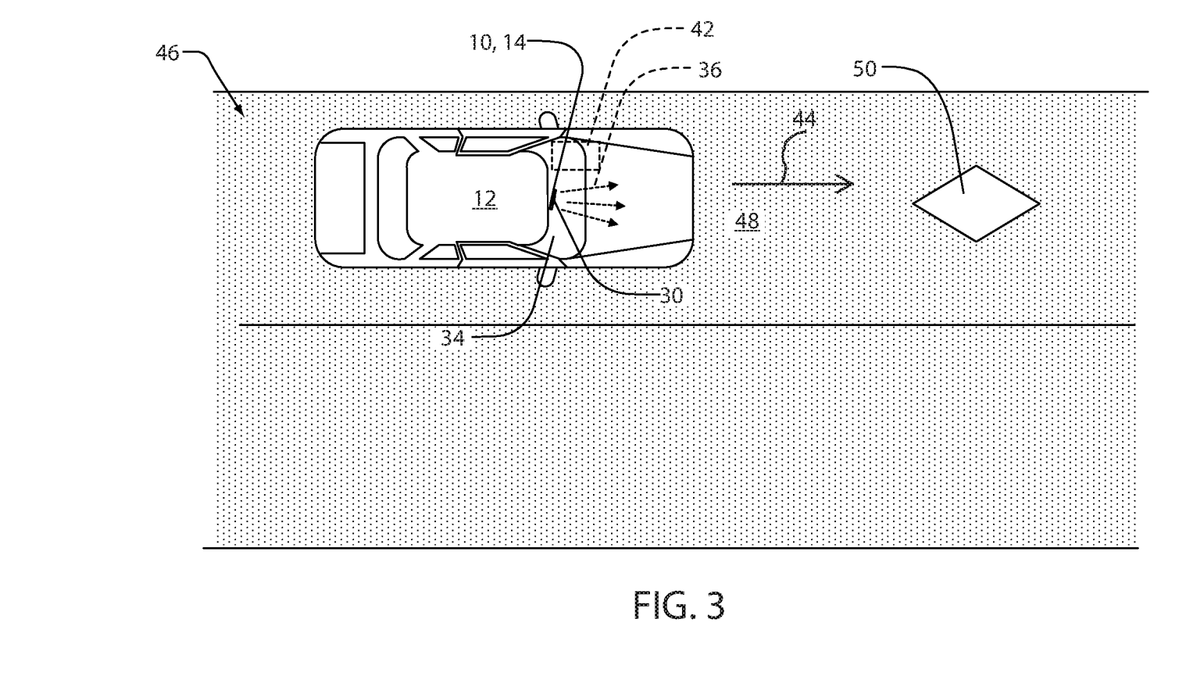
FIG. 3 is a schematic diagram of a vehicle demonstrating an operation of an operation indicator.
Figure 4:
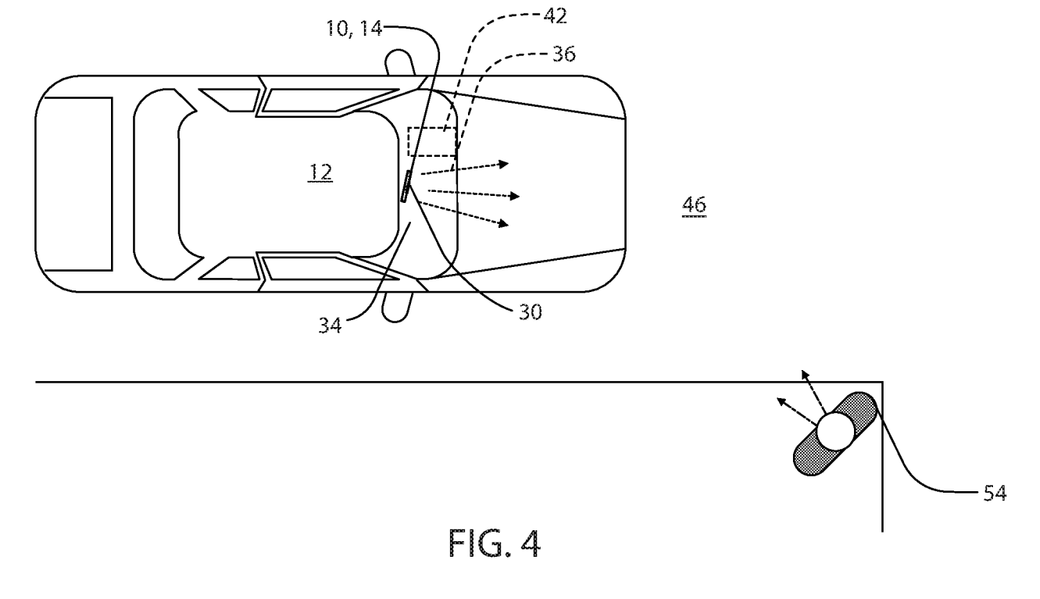
FIG. 4 is a schematic diagram of a vehicle demonstrating an operation of an operation indicator.

Referring now to FIGS. 3 and 4, the operation indicator 14 may be utilized for a variety of beneficial applications. Referring first to FIG. 3, in some embodiments, the controller of the operation indicator 14 may be in communication with an engine or vehicle control module 42 of the vehicle 12. In response to an operation indication signal from the vehicle control module 42, the controller may selectively activate the light source 28 of the operation indicator 14 to indicate an operating mode of the vehicle 12. Once activated, the indicator emission 36 may be emitted outward in the forward operating direction 44 of the vehicle 12. The indicator emission 36 may be emitted outward from the windscreen 34 communicating one or more operating properties or modes of operation of the vehicle 12 on a roadway 46.

In some embodiments, the operating mode of the vehicle 12 indicated by the indicator emission 36 may correspond to an identification of an electric or internal combustion operation of one or more engines of the vehicle 12. The indicator emission 36 may also communicate whether the vehicle 12 is operating in a conventional human driver mode of operation or an autonomous mode of operation. In an exemplary embodiment, the controller may be configured to control the operation indicator 14 to emit the indicator emission 36 based on an occupancy of the vehicle (e.g. a number of passengers in the vehicle 12). Accordingly, the operation indicator 14 may emit the indicator emission 36 such that an onlooker of the vehicle 12 may identify one or more operating properties or operating modes of the vehicle 12.

The electric operating mode may particularly be distinguished from an internal combustion operating mode in hybrid electric vehicles or plug-in electric hybrid vehicles. In such vehicles, an internal combustion mode of operation may be activated when an electrical battery has insufficient energy to sustain the operation of the vehicle 12. As provided by the disclosure, the controller 60 may identify the operating mode of the vehicle and control the light source 28 to selectively activate indicator emission 36 such that a visual indication of the operating mode of the vehicle 12 is visible through the windscreen 34.

One particularly beneficial application of the operation indicator 14 may be for enforcement of one or more traffic or operating requirements for the roadway 46. For example, if the roadway 46 comprises a restricted use lane 48 (indicated by a symbol 50), the controller may be configured to selectively activate the indicator emission 36 and may serve as a visual indication to an enforcement official identifying whether the mode or operating properties of the vehicle 12 conform to the restriction for the restricted use lane 48. Such restrictions may include a minimum occupancy of the vehicle, a mode of operation (e.g. internal combustion or electric, autonomous or human operated), or a variety of other operating properties or modes for the vehicle 12. Accordingly, if the restricted use lane 48 requires conformance to one or more of the restrictions, an enforcement officer may utilize the indicator emission 36 as a visual indication of the conformance of the vehicle 12 to the operating restriction. That is, the enforcement official may utilize the indicator emission 36 as a factor in deciding whether the vehicle is conforming to the operating restriction and apply appropriate enforcement procedures accordingly.

Additionally, in some embodiments, the vehicle accessory 10 may comprise or otherwise be in communication with an image sensor (shown in FIG. 4). The image sensor may be configured to capture image data in a field of view and detect one or more conditions of the operating environment of the vehicle 12. For example, the image sensor may be configured to communicate the image data to a processor to identify one or more identifiers (e.g. the symbol 50 identifying the restricted use lane 48) on the roadway 46. In response to identifying the symbol 50 or identifier, the controller may compare an operating requirement indicated by the symbol 50 to an operating condition or state of the vehicle 12 to determine a compliance with the operating requirement. In response the determination of the compliance, the controller may selectively activate the light source 28 to output the indicator emission 36. In this way, the controller may automatically activate the indicator emission 36 during conditions where the indication may be necessary to communicate the operating condition or properties of the vehicle.

Referring now to FIG. 4, the operation indicator 14 may similarly be applied in a variety of additional operating environments to indicate the mode of operation of the vehicle 12. For example, the vehicle 12 is demonstrated by operating in a roadway 46 with a pedestrian 54. If the vehicle 12 is operating in autonomous mode or human driver mode, the controller may identify such a mode of operation based on the operation indication signal from the vehicle control module 42. In response to an indication of either mode (e.g. an autonomous mode), the controller may control the light source 28 to activate indicator emission 36. In this way, the controller may be configured to selectively activate the indicator emission 36 to notify the pedestrian 54 that the vehicle 12 is operating in an autonomous or human operated mode of operation. Though a pedestrian is described in this particular example, an enforcement official or motorist may similarly utilize the visual identification emitted from the operation indicator 14 as the indicator emission 36 to identify the mode of operation of the vehicle 12.

Figure 5:
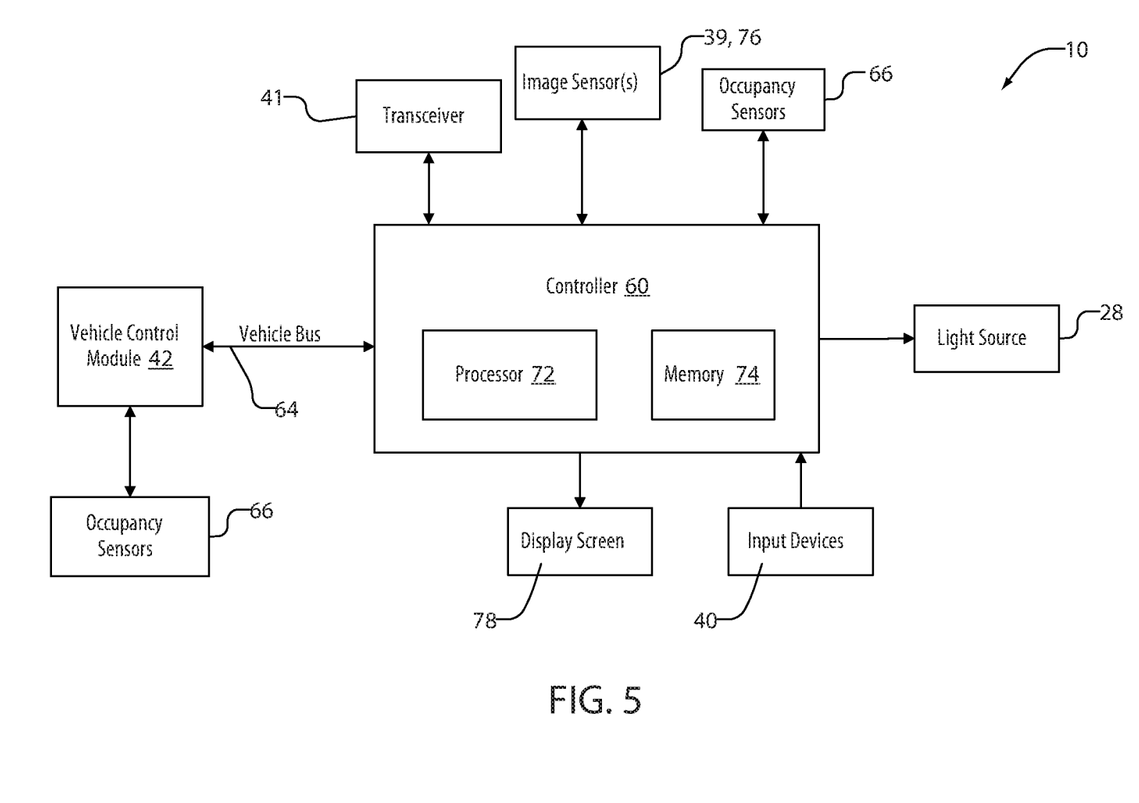
FIG. 5 is a block diagram of a controller configured to control an operation indicator in accordance with the disclosure.

Referring to FIG. 5, a block diagram of the controller 60 is shown. As discussed herein, the controller 60 may be in communication with a vehicle control module 42 via a vehicle bus 64 to identify the mode of operation of the vehicle 12. For example, the controller 60 may identify the mode of operation based on the operation indication signal from the vehicle control module 42. Accordingly, the controller 60 may selectively activate the light source 28 of the operation indicator 14 to indicate an operating mode of the vehicle 12.

As discussed previously, the modes of operation may include, but, are not limited to, an electric operating mode, an internal combustion operating mode, an autonomous (robotic or computer-assisted) operating mode, a conventional human driver operated mode, etc. The electric operating mode may particularly be distinguished from an internal combustion operating mode in hybrid electric vehicles or plug-in electric hybrid vehicles. In such vehicles, an internal combustion mode of operation may be activated when an electrical battery has insufficient energy to sustain the operation of the vehicle 12. As provided by the disclosure, the controller 60 may identify the operating mode of the vehicle and control the light source 28 to selectively activate indicator emission 36 such that a visual indication of the operating mode of the vehicle 12 is visible through the windscreen 34.

Additionally, the controller 60 may be configured to identify an occupancy of the vehicle 12 via one or more occupancy sensors 66. The occupancy sensors 66 may be incorporated in the vehicle accessory 10 or in communication with the controller 60 via a communication interface (e.g. the vehicle bus 64). The occupancy sensors 66 may correspond to one or more weight sensors, image sensors, proximity or presence sensors or various detection devices that may be utilized in the vehicle 12. Based on the detection signals from the one or more occupancy sensors 66, the controller 60 may selectively activate the light source 28 to identify an occupancy condition of the vehicle 12. For example, controller 60 may be configured to monitor detection signals or image data from the occupancy sensors 66 to identify if more than one occupant is in the passenger compartment 20 of the vehicle 12. In response to the identification of the occupancy being greater than one passenger, the controller 60 may activate the light source 28 to illuminate the operation indicator 14.

In order to facilitate the various operations discussed herein, the controller 60 may comprise a processor 72 configured to receive the image data and various other data discussed herein. The processor 72 may be in communication with a memory 74 configured to store various data and/or instructions to support processing. The processor 72 may be implemented using a microcontroller, a microprocessor, a digital signal processor, a programmable logic unit, a discrete circuitry, or any combination thereof. Additionally, the microcontroller may be implemented using more than one microprocessor.

Additionally, in some embodiments, the vehicle accessory 10 may comprise or otherwise be in communication with an image sensor 76 (e.g. the image sensor 39). The image sensor 76 may be configured to capture image data and detect one or more conditions of the operating environment of the vehicle 12. For example, the image sensor 76 may be configured to communicate the image data to the processor 72 to identify one or more identifiers (e.g. the symbol 50 identifying the restricted use lane 48) on the roadway 46. In response to identifying the symbol 50, the controller 60 may selectively activate the light source 28 to output the indicator emission 36. In this way, the controller 60 may automatically activate the indicator emission 36 during conditions where the indication may communicate the operating condition or properties of the vehicle 12.

The image sensor 76 (e.g. the image sensor 39) may correspond to any form of image or light sensor, for example a charge-coupled device (CCD) or complementary metal-oxide-semiconductor (CMOS). Further, detailed description of image sensors and vehicle detection systems configured to detect a target vehicle are described in commonly assigned U.S. Pat. Nos. 5,837,994; 5,990,469; 6,008,486; 6,130,448; 6,130,421; 6,049,171; 6,465,963; 6,403,942; 6,587,573; 6,611,610; 6,621,616; 6,631,316; 6,774,988; 6,861,809; and 8,045,760 and U.S. Provisional Patent Application Nos. 60/404,879 and 60/394,583, the disclosures of which are also incorporated herein in their entireties by reference. Also, commonly assigned U.S. Provisional Application Nos. 60/780,655 and 60/804,351 and U.S. Pat. No. 8,339,526 and U.S. Patent Application Publication No. 2009/0096937 describe various displays for use with the present disclosure. The entire disclosures of each of these applications are also incorporated herein by reference.

In some embodiments, the vehicle accessory 10 may also comprise a display screen 78 configured to display image data. The display screen 78 may be configured to display the image data from one or more of the image sensors 76 as discussed herein. The display screen 78 may correspond to a liquid crystal display (LCD), a light emitting diode (LED) display, or a variety of display technologies.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above are merely for illustrative purposes and not intended to limit the scope of the device, which is defined by the following claims as interpreted according to the principles of patent law, including the Doctrine of Equivalents.

The invention claimed is:

1. An accessory for a vehicle comprising:
   a housing comprising a front surface configured to display a rearward directed field of view from a vehicle and a rear surface directed in a forward operating direction of the vehicle;
   an at least partially light transmissive panel directed toward a front windscreen of the vehicle and in connection with the rear surface;
   a light source disposed in the housing proximate the light transmissive panel and configured to emit light through the at least partially light transmissive panel; and
   a controller in communication with the light source, wherein the controller is configured to:
      receive an indication of an operating condition of the vehicle; and
      selectively activate the light source in response to the received indication of the operating condition of the vehicle being in compliance with a vehicle operating requirement for operation on a roadway, wherein the operating condition comprises at least one of an electric propulsion and an autonomous operation of the vehicle.

2. The vehicle accessory according to claim 1, wherein the controller is further in communication with a vehicle control module and is configured to receive an operation indication signal from the vehicle control module indicating the operating condition of the vehicle.

3. The vehicle accessory according to claim 1, wherein the operating condition comprises an electric propulsion operation of a hybrid electric vehicle.

4. The vehicle accessory according to claim 1, wherein the operating condition comprises an autonomous operation of the vehicle.

5. The indication accessory according to claim 1, further comprising an image sensor configured to capture image data of a scene proximate to the vehicle.

6. The indication accessory according to claim 5, wherein the controller is further configured to:
process the image data and identify at least one roadway symbol; and
determine the operating requirement based on the roadway symbol.

7. The indication accessory according to claim 1, wherein the operating requirement comprises at least one of a vehicle propulsion characteristic and an autonomous vehicle operation condition.

8. The vehicle accessory according to claim 1, wherein:
the controller is further configured to receive an indication of a vehicle operating requirement for operation on a roadway; and
the light source is selectively activated in response to the received indication of the operating condition of the vehicle being in compliance with the received indication of the vehicle operating requirement.

9. A method for controlling an indicator accessory for a vehicle, the method comprising:
detecting a vehicle operating requirement for operation on a roadway;
monitoring an operating condition of the vehicle, wherein the operating condition indicates at least one of a number of passengers in the vehicle, a vehicle propulsion characteristic, and an autonomous vehicle operation condition;
selectively activating a light source disposed on the indicator accessory in response to the operating condition meeting the operating requirement, wherein upon activation, the light source emits a compliance indication; and
emitting the compliance indication from the light source outward from the vehicle.

10. The method according to claim 9, further comprising:
capturing image data with an image sensor in a region proximate to the vehicle.

11. The method according to claim 10, further comprising:
identifying a roadway symbol based on the image data.

12. The method according to claim 11, further comprising:
determining the operating requirement based on the roadway symbol.

13. The method according to claim 12, wherein the operating requirement is a vehicle occupancy requirement.

14. The method according to claim 9, wherein the operating requirement is a vehicle propulsion characteristic.

15. The method according to claim 9, wherein the operating requirement is an autonomous vehicle operation condition.

16. An indication accessory for a vehicle comprising:
a housing comprising a front surface configured to display a rearward directed field of view from the vehicle and a rear surface directed in a forward operating direction of the vehicle;
a light source in connection with the accessory and configured to emit light from the rear surface of the housing; and
a controller configured to:
monitor an operating characteristic of the vehicle;
based on the operating characteristic, selectively activate the light source emitting a compliance indication from the vehicle in response to the operating characteristic conforming to an operation compliance requirement.

17. The indication accessory according to claim 16, wherein the compliance requirement comprises at least one of a vehicle propulsion characteristic, an occupancy requirement, and an autonomous vehicle operation condition.

18. The indication accessory according to claim 16, wherein the controller is in communication with a vehicle control module and the operating characteristic is as at least one of the vehicle propulsion characteristic and autonomous vehicle operation condition.

19. The indication accessory according to claim 16, further comprising:
a vehicle occupancy sensor configured to detect an occupancy of the vehicle, wherein:
the operating characteristic is an occupancy, and the operation compliance requirement is the vehicle exceeding an occupancy threshold.

20. The indication accessory according to claim 16, further comprising:
an imager configured to capture image data in a field of view proximate to the vehicle;
wherein the controller is further configured to:
process the image data and identify at least one roadway symbol; and
determine the operation compliance requirement based on the roadway symbol.

* * * * *